US010186175B2

(12) United States Patent
Koda et al.

(10) Patent No.: US 10,186,175 B2
(45) Date of Patent: Jan. 22, 2019

(54) DISPLAY BODY AND OBSERVING METHOD FOR DISPLAY BODY

(71) Applicant: TOPPAN PRINTING CO., LTD., Taito-ku, Tokyo (JP)

(72) Inventors: Soko Koda, Tokyo (JP); Akira Nagano, Tokyo (JP)

(73) Assignee: Toppan Printing Co., Ltd., Taito-ku, Tokyo (JP)

( * ) Notice: Subject to any disclaimer, the term of this patent is extended or adjusted under 35 U.S.C. 154(b) by 134 days.

(21) Appl. No.: 15/272,780

(22) Filed: Sep. 22, 2016

(65) Prior Publication Data

US 2017/0011665 A1 Jan. 12, 2017

Related U.S. Application Data

(63) Continuation of application No. PCT/JP2015/059688, filed on Mar. 27, 2015.

(30) Foreign Application Priority Data

Mar. 27, 2014 (JP) ................................ 2014-065630

(51) Int. Cl.
*B42D 25/30* (2014.01)
*G09F 3/00* (2006.01)
(Continued)

(52) U.S. Cl.
CPC ........... *G09F 3/0294* (2013.01); *B42D 25/23* (2014.10); *B42D 25/324* (2014.10); *B42D 25/351* (2014.10); *B42D 25/373* (2014.10)

(58) Field of Classification Search
CPC .... B42D 25/23; B42D 25/324; B42D 25/351; B42D 25/373; G09F 3/0294
See application file for complete search history.

(56) References Cited

U.S. PATENT DOCUMENTS 8,696,940 B2 * 4/2014 Gordon .................. C08G 73/18 252/500
2008/0259455 A1 * 10/2008 Stuck ..................... B82Y 20/00 359/568

(Continued)

FOREIGN PATENT DOCUMENTS

JP 2008-83226 A 4/2008
JP 2009-46742 A 3/2009

(Continued)

OTHER PUBLICATIONS

International Preliminary Report on Patentability dated Sep. 27, 2016 in International Patent Application No. PCT/JP2015/059688, 7 pages.

(Continued)

*Primary Examiner* — Charles A Fox
*Assistant Examiner* — Christopher E Veraa
(74) *Attorney, Agent, or Firm* — Squire Patton Boggs (US) LLP

(57) ABSTRACT

A display body includes a first display part, which displays first information, and a second display part, which displays second information of a larger display size than the first information. The second display part includes the entire first display part as a part of the second display part. The first display part has a plasmon structure. The plasmon structure includes an interface between a metal layer and a dielectric layer, which transmits light, and is configured so that surface plasmons are excited in the interface to change irradiation light with which the interface is irradiated to transmitted light having a color different from that of the irradiation light. The first information is displayed with the transmitted light.

13 Claims, 7 Drawing Sheets

(51) Int. Cl.

| | |
|---|---|
| ***B42D 25/373*** | (2014.01) |
| ***B42D 25/23*** | (2014.01) |
| ***B42D 25/324*** | (2014.01) |
| ***B42D 25/351*** | (2014.01) |

(56) References Cited

U.S. PATENT DOCUMENTS

2010/0307705 A1* 12/2010 Rahm .................... B42D 25/29 162/140
2012/0127547 A1 5/2012 Gocho et al.
2014/0185282 A1* 7/2014 Hsu ........................... F21V 9/08 362/231
2014/0285892 A1* 9/2014 Sauvage-Vincent ......................... G02B 5/008 359/572
2014/0311662 A1* 10/2014 Choi ...................... G02B 5/008 156/234
2015/0042702 A1* 2/2015 Jiang .................... G09G 3/3413 345/694
2015/0219807 A1* 8/2015 Lochbihler .......... G02B 5/1809 359/567
2015/0362642 A1* 12/2015 Nagano .................... G02B 5/02 283/72
2016/0107472 A1* 4/2016 Garcia Juez ........... B42D 25/00 283/94
2016/0257160 A1* 9/2016 Firth ...................... B82Y 20/00
2017/0116808 A1* 4/2017 Kobrin ................. B42D 25/378
2017/0225502 A1* 8/2017 Sauvage-Vincent ......................... B42D 25/328

FOREIGN PATENT DOCUMENTS

JP 2011-194837 A 10/2011
JP 2013-174683 9/2013
JP 2013-193268 9/2013
JP 2013-193361 A 9/2013
JP 2013-218595 A 10/2013

OTHER PUBLICATIONS

International Search Report for Application No. PCT/JP2015/059688, dated Jun. 16, 2015, English translation.

* cited by examiner

DISPLAY BODY AND OBSERVING METHOD FOR DISPLAY BODY

BACKGROUND

The technology of the present disclosure relates to a display body using surface plasmons and a method for observing a display body.

In order to protect, from other persons, values or information of products such as valuable securities, certificates, brand-name products, high price products, electronic devices, and personal authentication media, it is desirable that the products be difficult to counterfeit. Therefore, in some cases, such a product may be attached with a display body that is difficult to counterfeit.

As a display body that is difficult to counterfeit, there is known a display body for displaying image information by using a plurality of cells formed by diffraction grating. With respect to such a display body, there is also known a display body having a micro-image that corresponds to a bitmap pattern having two or more values inside a specific cell among a plurality of cells and can be observed by using a microscope (refer to, for example, Japanese Laid-Open Patent Publication No. 2008-83226).

However, a micro-image corresponding to a bitmap pattern having two or more values displays an image by two or more height differences. For this reason, for example, when dust or a stain having the same size as the height difference constituting the micro-image overlaps with a part of the micro-image, there is a possibility that an observer of a display body falsely recognizes the dust or stain as a part of the micro-image.

SUMMARY

The technology of the present disclosure is to provide a display body capable of restraining information false recognition of an observer and a method for observing a display body.

To achieve the foregoing objective and in accordance with one aspect of the present invention, a display body is provided that includes a first display part, which displays first information, and a second display part, which displays second information having a display size greater than that of the first information. The second display part includes the entire first display part as a part of the second display part. The first display part includes a plasmon structure. The plasmon structure is configured to include an interface between a metal layer and a dielectric layer that transmits light, excite surface plasmons in the interface to change irradiation light with which the interface is irradiated to transmitted light having a color different from that of the irradiation light, and display the first information with the transmitted light.

In accordance with another aspect of the present invention, a method for observing a display body is provided. The display body includes a first display part, which displays first information, and a second display part, which displays second information having a display size greater than that of the first information. The second display part includes the entire first display part as a part of the second display part. The first display part includes a plasmon structure. The plasmon structure is configured to include an interface between a metal layer and a dielectric layer that transmits light, excite surface plasmons in the interface to change irradiation light with which the interface is irradiated to transmitted light having a color different from that of the irradiation light, and display the first information with the transmitted light. The method includes irradiating the interface of the display body with the irradiation light and observing the display body irradiated with the irradiation light in a magnifying manner.

In accordance with one aspect of the display body according to the technology of the present disclosure, since the first display part included in the second display part displays the first information with the transmitted light having a predetermined color, the observer of the display body can recognize the first information by using the difference between the light having a predetermined color and the other parts. Therefore, the difference between a part for the first information and the other parts can be easily recognized. As a result, false recognition of information by the observer is restrained.

DESCRIPTION OF EXEMPLARY EMBODIMENTS

A display body and a method for observing the display body according to one embodiment of the present disclosure will now be described with reference to FIGS. 1 to 7. Hereinafter, the overall configuration of a display body, the configuration of a micro-display part included in the display body, the configuration of a display element, functions of the micro-display part, and a method for observing the display body will be sequentially described.

[Overall Configuration of Display Body]

An overall configuration of a display body will now be described with reference to FIG. 1A and FIG. 1B. FIG. 1B is a diagram illustrating a part surrounded by a circle indicated by a long dashed short dashed line of FIG. 1A in a magnified manner.

Figure 1A:
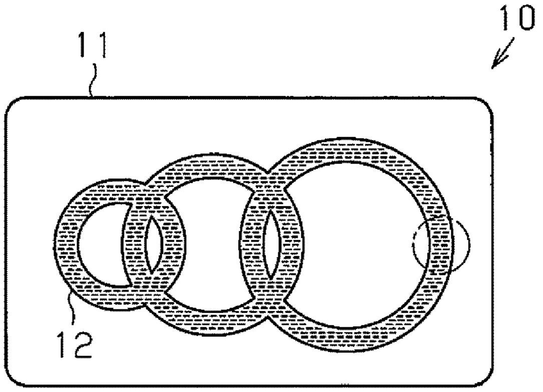
FIG. 1A is a diagram illustrating a schematic configuration of a display body according to one embodiment of the present disclosure.
Figure 1B:
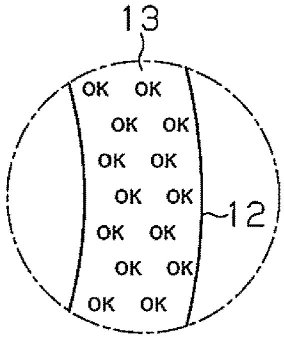
FIG. 1B is a partially enlarged diagram illustrating a part of a B display body.

As illustrated in FIG. 1A, a display body 10 is configured to include a substrate 11, a display part 12 located on one surface of the substrate 11, and a plurality of micro-display parts located on one surface of the substrate 11. The substrate 11 has, for example, a rectangular plate shape. However, if the substrate has an area where the display part 12 can be located, the shape thereof is not limited to the rectangular plate shape, but the substrate may have other shapes such as a circular plate shape or a rectangular parallelepiped shape.

The display part 12 is an example of a second display part and displays second information, which is predetermined information. Information displayed by the display part 12 is, for example, an image, and as illustrated in FIG. 1A, a shape in which two adjacent circles among three circles are continuous with each other is an example of the image. The image, as information displayed by the display part 12, is not limited to figures such as design patterns or shapes, but the image may be characters, symbols, and numerals or may be a combination of at least two of figures, characters, symbols, and numerals. In addition, the information displayed by the display part 12 is not limited to an image, but the information may be color information such as the ratio of a specific color to the entire display part 12, a color arrangement of the display part 12, or the existence of a color, or may be position information such as a position where a specific color is arranged or a position where a color is added in the display part 12.

As illustrated in FIG. 1B, the display part 12 includes the entirety of each micro-display part 13 as a part of the display part 12. That is, the display part 12 is larger than each micro-display part 13 and has a size capable of including the micro-display parts 13 as a part.

For example, the display part 12 may be a part displaying information by using light diffraction by a diffraction grating structure or may be a part of a metal layer formed on the surface of the substrate 11 having a predetermined shape that is formed by, for example, an etching method, in which information is displayed by light reflection or diffusion on the metal layer.

Each micro-display part 13 is an example of a first display part. The micro-display part 13 has a plasmon structure of exciting surface plasmons to change irradiation light with which the micro-display part 13 is irradiated to transmitted light having a color different from that of the irradiation light. The micro-display parts 13 are located within the display part 12. The display body 10 does not necessarily need to include the micro-display parts 13, but it may include only one micro-display part 13.

Each micro-display part 13 displays first information, which is predetermined information and has a display size smaller than that of the second information displayed by the display part 12, by the aforementioned transmitted light. That is, the display size of the second information displayed by the display part 12 may be greater than that of the first information displayed by the micro-display part 13, and the size of the display part 12 may be equal to the display size of the second information. For example, in a case in which the display part 12 displays a three-dimensional image, the size of the display part may be greater or smaller than the display size of the second information. The size of the micro-display part 13 may also be equal to the display size of the first information or may be larger or smaller than the display size of the first information.

The first information is, for example, a predetermined character line as an example of the image. The character line in which a Roman letter O and a Roman letter K are continuous, illustrated by FIG. 1B, is an example of the first information. Similarly to the above-described second information, the first information displayed by the micro-display part 13 may be an image, color information, or position information.

The entirety of each micro-display part 13 is included as a part of the display part 12. That is, the micro-display part 13 is smaller than the display part 12 and has a size capable of being included within the display part 12. The micro-display parts 13 may be arranged regularly or irregularly within the display part 12.

[Configuration of Micro-Display Part]

A more detailed configuration of the micro-display part 13 will now be described with reference to FIG. 2.

Figure 2:
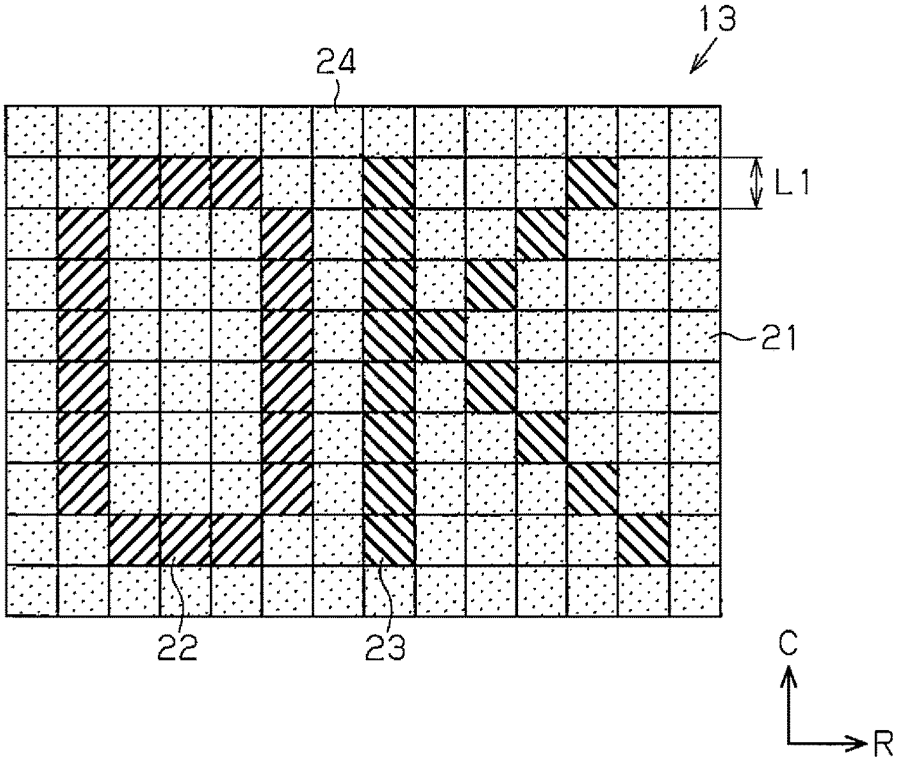
FIG. 2 is a diagram illustrating a micro-display part included in the display body in a magnified manner.

As illustrated in FIG. 2, the micro-display part 13 is configured to include a plurality of display elements 21 arranged in a matrix shape. Each display element 21 is a region having, for example, a rectangular shape defined inside the display part 12. The display element 21 is not limited to the rectangular shape, but it may be a region having, for example, various polygon shapes other than the rectangular shape, such as a triangular shape or a pentagonal shape. The first information displayed by the micro-display part 13 is configured with a plurality of information elements, and the micro-display part 13 is configured to include display elements 21 for respective information elements.

The length L1 of one side of each display element 21 is, for example, 200 nm or more and 3000 nm or less. If the length L1 of one side of the display element 21 is 200 nm or more and 3000 nm or less, the size of the display element 21 is a preferred size so that the micro-display part 13 is difficult to visually recognize and the micro-display part 13 can be observed at a magnification ratio settable in an optical microscope.

For example, the display elements 21 are arranged along a row direction R as one direction and are arranged along a column direction C perpendicular to the row direction R. The number of display elements 21 arranged in the row direction R is, for example, 10 or more and 100 or less, and the number of display elements 21 arranged in the column direction C is, for example, 10 or more and 100 or less. In this case, one micro-display part 13 is configured to include 100 or more and 10000 or less of the display elements 21.

When the length L1 of one side of each display element 21 is included within the aforementioned range, if the number of display elements 21 constituting one micro-display part 13 is 100 or more and 10000 or less, the size of the micro-display part 13 is a preferred size in terms of the following point. That is, the size of the micro-display part 13 is a preferred size so that the micro-display part 13 is difficult to visually recognize and the micro-display part 13 can be observed at a magnification ratio settable in an optical microscope.

The first information displayed by each micro-display part 13 includes a plurality of information elements including a first information element representing a first color and a second information element representing a second color different from the first color. The display elements 21 constituting the micro-display part 13 include a first display element 22 corresponding to the first information element representing the first color and a second display element 23 corresponding to the second information element representing the second color. The plasmon structure included in the first display element 22 and the plasmon structure included in the second display element 23 transmit light having different colors.

In each micro-display part 13, for example, the first display elements 22 display a Roman letter O, and the second display elements 23 display a Roman letter K. For example, when the first display elements 22 correspond to the first information elements representing red as the first color, the micro-display part 13 displays a red Roman letter O as a part of the first information. On the other hand, when the second display elements 23 correspond to the second information elements representing blue as the second color, the micro-display part 13 displays a blue Roman letter K as a part of the first information.

Each micro-display part 13 further includes a plurality of peripheral elements 24 including a part between the first display elements 22 and the second display elements 23, a part surrounded by the first display elements 22, or a part surrounded by the second display elements 23. Each of the peripheral elements 24 may be a part that transmits the irradiation light with which the micro-display part 13 is irradiated without change in color of the irradiation light, may be a part that does not transmit the irradiation light, or may be a part that transmits light having a color different from those of the first display element 22 and the second display element 23. Each micro-display part 13 does not necessarily need to include the peripheral elements 24.

[Configuration of Display Element]

A detailed configuration of the display element 21 will now be described with reference to FIGS. 3 to 5. Hereinafter, among the display elements 21, the display elements 21 having plasmon structures like the first display element 22 and the second display element 23 will now be described.

Figure 3:
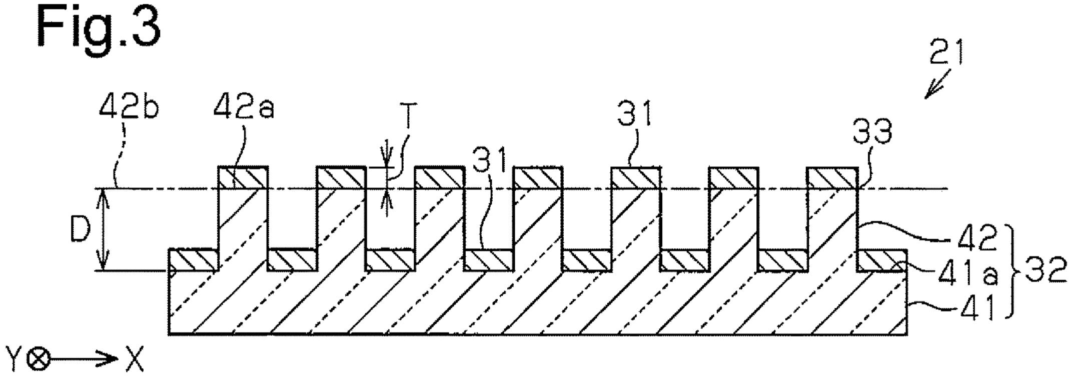
FIG. 3 is a partial cross-sectional view illustrating a partial cross-sectional structure of the micro-display part.

As illustrated in FIG. 3, the display element 21 has a plasmon structure configured to include a metal layer 31, a dielectric layer 32, which transmits light, and an interface 33 between the metal layer 31 and the dielectric layer 32. The plasmon structure of the display element 21 excites surface plasmons in an interface 33 by the irradiation light with which the interface between the dielectric layer 32 and the metal layer 31 is irradiated to change the irradiation light to light having a color different from that of the irradiation light.

The dielectric layer 32 includes, for example, a base body 41 having a base surface 41*a* as one surface, and the base body 41 includes a plurality of protrusions 42, which protrude from the base surface 41*a*. The base surface 41*a* is a formation surface on which the protrusions 42 are formed. The dielectric layer 32 may have a multi-layered structure including layers other than the base body 41. In each protrusion 42, a surface farther from the base surface 41*a* is a top surface 42*a*, and a surface including the top surfaces 42*a* of all the protrusions 42 is an imaginary plane 42*b*. The base surface 41*a* of the base body 41 and the imaginary plane 42*b* are substantially parallel to each other. The distance D between the base surface 41*a* and the imaginary plane 42*b* is preferably, for example, 30 nm or more and 500 nm or less.

The plasmon structure included in the display element 21 preferably has at least one interface 33 between the metal layer 31 and the dielectric layer 32. Therefore, the plasmon structure excites surface plasmons in the interface 33 by the irradiation light with which the interface 33 is irradiated to change the irradiation light to transmitted light having a color different from that of the irradiation light. The plasmon structure included in one display element 21 preferably has a configuration in which one display element 21 transmits transmitted light having a predetermined color and in which the plasmon structure includes two or more protrusions 42 and a metal layer 31 covering at least the top surface 42*a* of each protrusion 42.

Each protrusion 42 has, for example, a rectangular pillar shape. However, each protrusion may have a polygonal pillar shape other than the rectangular pillar shape such as a trigonal pillar shape or a pentagonal pillar shape, may have a cylindrical shape or an elliptic cylindrical shape, or may have a conical shape such as a cone shape or a polygonal pyramid shape. When each protrusion 42 has a polygonal pillar shape, each of the corners of the polygonal pillar shape may have a curvature. Furthermore, each protrusion 42 may have a plurality of step differences at a side surface connecting the top surface 42*a* and the base surface 41*a*. The side surface of each protrusion 42 may have a shape in which, in a step difference surface including a surface substantially parallel to the imaginary plane 42*b* and in a cross section along a direction of the thickness T of the metal layer 31 of each protrusion 42, a width thereof in a direction perpendicular to an extension direction of the protrusion 42 is increased for every step difference from the top surface 42*a* toward the base surface 41*a*. In such a configuration, the metal layer 31 may be located on each surface substantially parallel to the imaginary plane 42*b* in the side surface.

The material for forming the dielectric layer 32 is, for example, quartz. As the material for forming the dielectric layer 32, an inorganic material transmitting visible light other than quartz, for example, a titanium oxide or a magnesium fluoride may be used, or an organic material transmitting visible light, for example, various plastics may be used.

When the material for forming the dielectric layer 32 is an inorganic material, the dielectric layer 32 including the base body 41 and the protrusions 42 included in the base body 41 is formed, for example, by applying a chemical etching process, a physical etching process, or the like on a substrate formed by each material. When the material for forming the dielectric layer 32 is a plastic, the dielectric layer 32 including the base body 41 and the protrusions 42 included in the base body 41 is formed, for example, by transferring an original plate to a layer formed with the plastic.

The dielectric layer 32 constitutes a part of the substrate 11 in the display body 10. The entire substrate 11 may be formed with the same material as the material for forming the dielectric layer 32, or the substrate 11 may include the dielectric layer 32 and a portion formed with a material different from the material for forming the dielectric layer 32.

The metal layer 31 may be formed, for example, on the entire part in which the protrusions 42 are not formed on the base surface 41*a*, and on the top surfaces 42*a* of the protrusions 42. The metal layer 31 may be formed on a part of the base surface 41*a*, may be formed on a part of each top surface 42*a*, may be formed only on the base surface 41*a*, or may be only on the top surface 42*a*. Therefore, the interface 33 between the dielectric layer 32 and the metal layer 31 is formed. In the configuration in which the plasmon structure transmits light having a predetermined color by the surface plasmons in the interface 33, the thickness T of the metal layer 31 is, for example, 20 nm or more and 100 nm or less, preferably, 40 nm or more and 60 nm or less.

The material for forming the metal layer 31 is, for example, aluminum. The material for forming the metal layer 31 may be gold, silver, a titanium nitride, or the like, and the real part of the complex dielectric constant of the forming material in a visible light range preferably has a negative value. When the material for forming the metal layer 31 has such characteristics, the light transmitted by the excitation of the surface plasmons is reliably included in the visible light range. For this reason, an observer can reliably recognize the information displayed by the display body 10.

The metal layer 31 is formed, for example, by a physical vapor deposition method such as a vacuum vapor deposition method or a sputtering method. When the metal layer 31 is formed by a vacuum vapor deposition method, a fine uneven structure is formed on the surface of the metal layer 31. However, the fine uneven structure formed by the vacuum vapor deposition method has a size to such an extent that the fine uneven structure does not influence the state of the surface plasmons formed in the interface 33 between the metal layer 31 and the dielectric layer 32. For this reason, the metal layer 31 may have such an uneven structure, that is, surface roughness, to the extent that the uneven structure is formed by the vacuum vapor deposition method.

Figure 4:
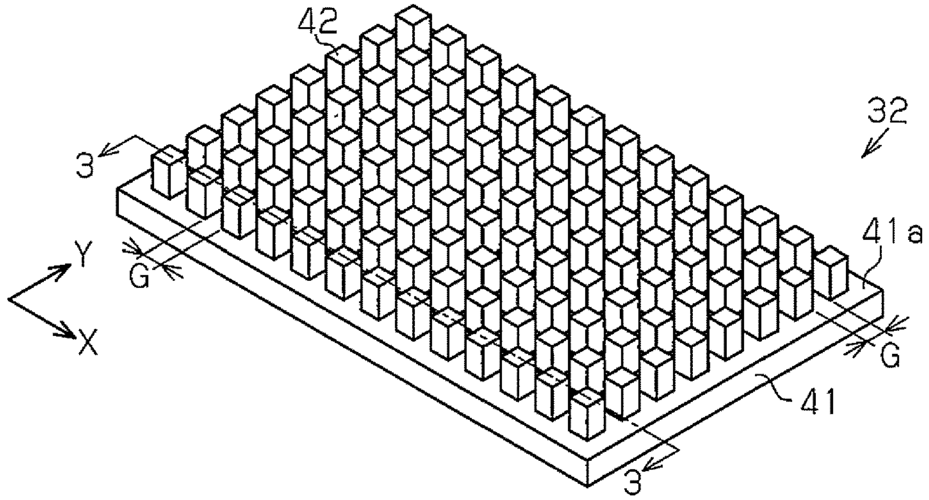
FIG. 4 is a partial perspective view illustrating a partial perspective structure of a dielectric layer included in the micro-display part.

As illustrated in FIG. 4, a plurality of protrusions 42 are, for example, arranged to be spaced at an equal interval G in an X direction as one direction and arranged to be spaced at the equal interval G in a Y direction perpendicular to the X direction. That is, a plurality of protrusions 42 is arranged regularly in a tetragonal lattice shape on the base surface 41*a* of the base body 41. FIG. 3 illustrated above illustrates a cross-sectional structure taken along line 3-3 of FIG. 4.

Figure 5:
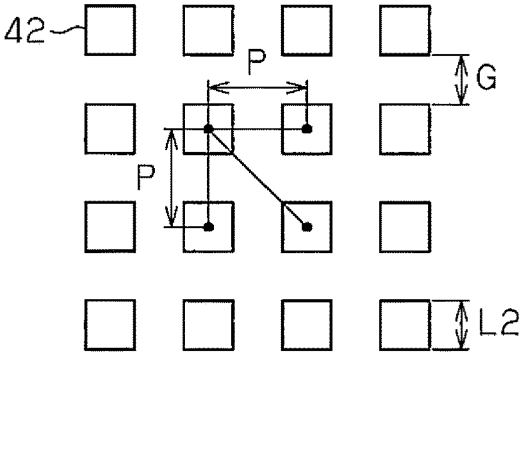
FIG. 5 is a top view illustrating a structure of a top surface of the dielectric layer as viewed from the top side.

As illustrated in FIG. 5, in the protrusions 42, the interval G between the protrusions 42 adjacent to each other in the X direction is equal to the interval G between the protrusions 42 adjacent to each other in the Y direction. As viewed from the plane facing the base body 41, that is, the base surface 41*a* in the dielectric layer 32, the length L2 of one side of each protrusion 42 is, for example, equal to the interval G, and when the sum of the interval G and the length L2 is one period P, the period P is preferably, for example, 100 nm or more and 600 nm or less. The period P is a distance, that is, an inter-center distance between centers of the protrusions 42 in the protrusions 42 adjacent to each other as viewed from a plane facing the base surface 41*a*.

On the other hand, in the protrusions 42, the distance between the protrusions 42 adjacent to each other in the direction intersecting the X direction is greater than the period P. For this reason, the protrusions 42 arranged in a tetragonal lattice shape include parts in which the distance between the adjacent protrusions 42 is the period P and parts in which the distance between the adjacent protrusions 42 is greater than the period P. Therefore, in the display element 21 including the protrusions 42 arranged in a tetragonal lattice shape, the state of the surface plasmons formed in the interface 33 in the part in which the distance between two of the protrusions 42 is the period P and the state of the surface plasmons formed in the interface 33 in the part in which the distance between two of the protrusions 42 is greater than the period P are different from each other.

On the assumption that the material for forming the dielectric layer 32 is the same and the period P is the same, the color of light transmitted by the plasmon structure is changed by changing the fill factor, which is the ratio of the length L2 of one side of the protrusion 42, to the period P.

[Operation of Micro-Display Part]

As described above, each micro-display part 13 includes the first display element 22 and the second display element 23. Each of the first display element 22 and the second display element 23 has a plasmon structure including the interface 33 between the metal layer 31 and the dielectric layer 32 to transmit light having a color different from that of the irradiation light by the surface plasmons excited in the interface 33.

The color of light transmitted by each first display element 22 and the color of light transmitted by each second display element 23 are determined according to the state of the surface plasmons formed in the plasmon structure. Between the two interfaces 33, the states of the surface plasmons formed in the two interfaces 33 are different from each other when at least one of the following conditions is different therebetween. That is, if at least one of the period P of the dielectric layer 32, the distance D between the base surface 41*a* and the imaginary plane 42*b* in the dielectric layer 32, the arrangement state of the protrusions 42 on the base surface 41*a*, the thickness T of the metal layer 31, and the material for forming the metal layer 31 is different between the two interfaces 33, the state of the surface plasmons is different between the two interfaces 33.

For this reason, at least one of the conditions described above is different between the plasmon structure included in the first display element 22 and the plasmon structure included in the second display element 23. Therefore, the state of the surface plasmons excited is different between the first display element 22 and the second display element 23, so that the color of the light transmitted by the first display element 22 is different from the color of the light transmitted by the second display element 23.

In this manner, each micro-display part 13 displays the first information by the light having a predetermined color generated by the excitation of the surface plasmons. Since the micro-display part 13 included in the display part 12 displays the first information by the transmitted light having a predetermined color, the observer of the display body 10 can recognize the first information by using the difference between the light having a predetermined color and the other part. Therefore, the difference between the part for the first information and the other part can be easily recognized. As a result, false recognition of information by the observer is restrained.

In comparison with a configuration in which the first display element 22 and the second display element 23 transmit the light having the same color, the display body 10 can display more complicated information.

[Method for Observing Display Body]

A method for observing the display body 10 will now be described with reference to FIGS. 6 and 7.

Figure 6:
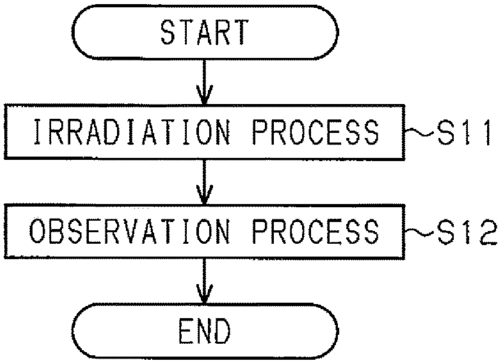
FIG. 6 is a flowchart illustrating a method for observing the display body.

As illustrated in FIG. 6, the method for observing the display body 10 includes an irradiation process (step S11)

and an observation process (S12). In the irradiation process, in the display body 10, the interface between the dielectric layer 32 and the metal layer 31 included in the micro-display part 13 is irradiated with the irradiation light. In the observation process, the display body 10 irradiated with the irradiation light is observed in a magnified manner. The observation of the display body 10 may be performed visually by a person, or it may be performed by an apparatus capable of detecting the transmitted light of the display body 10.

Figure 7:
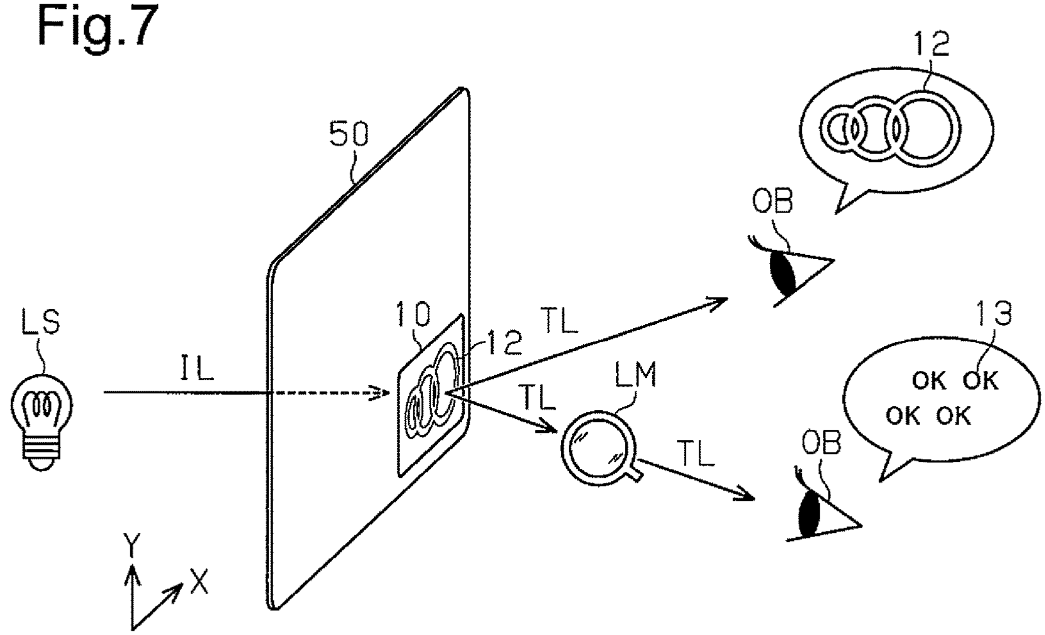
FIG. 7 is a schematic diagram illustrating operation of the method for observing the display body.

As illustrated in FIG. 7, the above-described display body 10 is attached to an object-to-be-authenticated 50. At the time of observing the display body 10 attached to the object-to-be-authenticated 50, the display body 10 is irradiated with light, for example, from the dielectric layer 32 toward the metal layer 31 included in in the display body 10. Therefore, the interface 33 between the dielectric layer 32 and the metal layer 31 is irradiated with light. In this case, the object-to-be-authenticated 50 is a substrate or the like that allows light to reach the display body 10 through the object-to-be-authenticated 50. Alternatively, when the display body 10 is attached to the object-to-be-authenticated 50, the display body 10 may be attached in the state that the display body 10 is directly irradiated with light. The display body 10 may be irradiated with the light from the metal layer 31 toward the dielectric layer 32 included in the display body 10, so that the interface 33 between the dielectric layer 32 and the metal layer 31 is irradiated with the light. Also in this case, it is possible to obtain the same advantage as that of the case in which the display body is irradiated with light from the dielectric layer 32 toward the metal layer 31.

Hereinafter, a front surface of the display body 10 is a surface on which the metal layer 31 of each display element 21 is exposed, and a back surface of the display body 10 is a surface that is opposite to the surface on which the metal layer 31 of each display element 21 is exposed and on which the dielectric layer 32 is exposed.

In the irradiation process, for example, a light source LS emitting white light as irradiation light IL irradiates the back surface of the display body 10 with the irradiation light IL. At this time, in the state that the observer OB visually observes the display body 10, the observer OB can observe only the second information displayed by the display part 12 in the information displayed by the display body 10. On the other hand, in the state that the observer OB observes the display body 10 through an optical microscope LM, the observer OB can observe the first information displayed by the micro-display part 13 as the transmitted light TL having a color different from that of the irradiation light IL in the information displayed by the display body 10.

In this manner, the display body 10 can provide different information to the observer OB in each of the two steps of the magnification ratio magnifying the display body 10. For this reason, the observer OB can determine authenticity of the object-to-be-authenticated 50, for example, by determining whether or not the display body 10 has the micro-display part 13 or by determining whether or not image, color information, or position information displayed by the micro-display part 13 is correct.

As described heretofore, according to the above-described embodiment, it is possible to obtain the advantages listed below.

(1) Since the micro-display part 13 displays the first information by the transmitted light having a predetermined color, the observer OB of the display body 10 can recognize the first information by using the difference between light having a predetermined color and the other parts. Therefore, the difference between the part for the first information and the other parts can be easily recognized. As a result, false recognition of information by the observer OB is restrained.

(2) Since the display elements 21 include the display elements 21 transmitting the transmitted light TL having different colors, the difference between the display elements can be easily recognized by the observer OB of the display body 10 in comparison with the configuration in which the display body 10 transmits only one color.

(3) Each of the number of the display elements 21 arranged in the row direction R and the number of the display elements 21 arranged in the column direction C is 10 or more and 100 or less. For this reason, the first information has a size that almost cannot be visually recognized and has a size which can be visually recognized through magnification of an optical microscope.

The above-described embodiment may be implemented through appropriate modifications as follows.

[Configuration of Metal Layer]

A modification of the metal layer 31 will now be described with reference to FIGS. 8 to 12.

Figure 8:
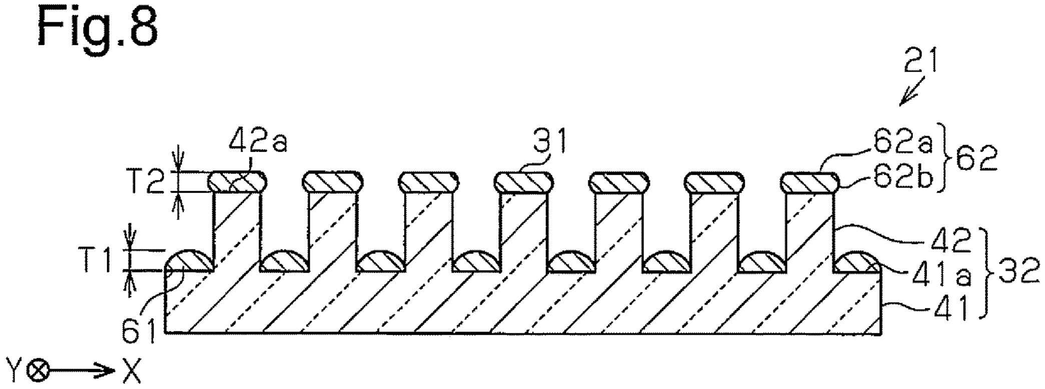
FIG. 8 is a partial cross-sectional view illustrating a partial cross-sectional structure of a micro-display part according to a modification.

As illustrated in FIG. 8, the metal layer 31 includes a base surface metal layer 61 located on base surface 41*a* and a top surface metal layer 62 located on the top surface 42*a*, the thickness of the base surface metal layer 61 is a base surface thickness T1, and the thickness of the top surface metal layer 62 is a top surface thickness T2. When the metal layer 31 is formed by the above-described physical vapor deposition method, for example, a vacuum vapor deposition method, particles constituting the metal layer 31 easily reach the top surface 42*a* of each protrusion 42 in comparison with the base surface 41*a*. For this reason, typically, the top surface thickness T2 is equal to or greater than the base surface thickness T1.

As viewed from the plane facing the base body 41, the top surface metal layer 62 includes a flat portion 62*a* located along the shape of the top surface 42*a* and a curved peripheral surface portion 62*b*, which is provided around the flat portion 62*a* and curved to protrude from the flat portion 62*a* toward the outside. That is, the curved peripheral surface portion 62*b* has a curved surface shape which protrudes toward the outside of the flat portion 62*a*. A radius of curvature of the curved peripheral surface portion 62*b* is preferably (T2/2) or more and (4×T2) or less, more preferably (T2/2) or more and (2×T2) or less.

A part between the protrusions 42 adjacent to each other in the Y direction in the base surface metal layer 61 is configured by a curved surface in which a substantial center between the two protrusions 42 protrudes in the direction away from the base surface 41*a*. A part between the protrusions 42 adjacent to each other in the X direction in the base surface metal layer 61 is configured by a curved surface in which a substantial center between the two protrusions 42 protrudes in the direction away from the base surface 41*a*. The radius of curvature in these portions is preferably (T1/2) or more and (4×T1) or less, more preferably (T1/2) or more and (2×T1) or less.

The parts not between the two protrusions 42 in both of the X and Y directions in the base surface metal layer 61 are configured with substantially flat surfaces because the flying angle of the particles for forming the metal layer 31 which reach the base surface 41*a* is not limited.

According to the configuration in which the each of the base surface metal layer 61 and the top surface metal layer 62 has a curved surface, it is possible to obtain the advantages listed below.

(4) The metal layer 31 can be easily formed according to a physical vapor deposition method such as a vacuum vapor deposition method or a sputtering method.

Figure 9:
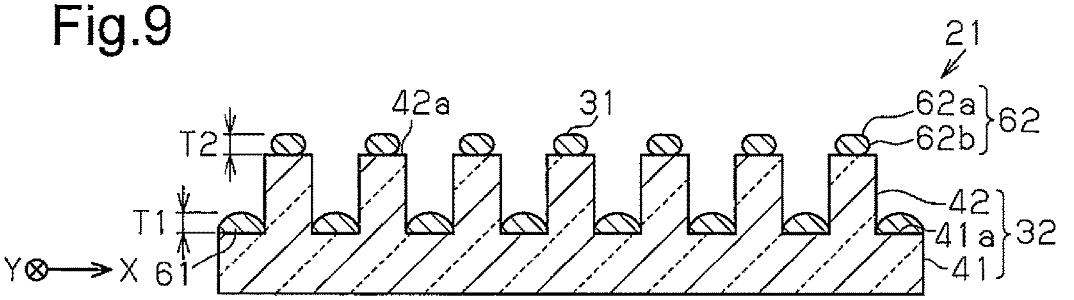
FIG. 9 is a partial cross-sectional view illustrating a partial cross-sectional structure of a micro-display part according to a modification.

As illustrated in FIG. 9, as viewed from the plane facing the base body 41, the flat portion 62*a* in the top surface metal layer 62 formed on the top surface 42*a* of each protrusion 42 may be located on a part of the top surface 42*a*.

Figure 10:
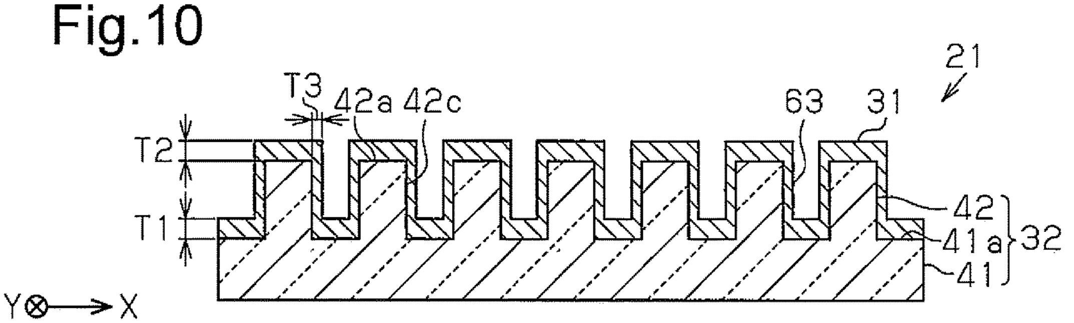
FIG. 10 is a partial cross-sectional view illustrating a partial cross-sectional structure of a micro-display part according to a modification.

As illustrated in FIG. 10, each protrusion 42 include a side surface 42*c* connecting the top surface 42*a* and the base surface 41*a*, and the metal layer 31 may also be located on the side surface 42*c*. The part of the metal layer 31 located on the side surface 42*c* is a side surface metal layer 63, and the thickness of the side surface metal layer 63 is a side surface thickness T3. The side surface thickness T3 is less than the base surface thickness T1 and is less than the top surface thickness T2.

When the metal layer 31 is formed by the above-described physical vapor deposition method, the particles for forming the metal layer 31 have difficulty reaching the side surface 42*c* of each protrusion 42 in comparison with the top surface 42*a* of each protrusion 42 and the parts in which the protrusions 42 are not formed in the base surfaces 41*a* of the base body 41. For this reason, according to the physical vapor deposition method, the metal layer 31 is easily formed in which the side surface thickness T3 is less than each of the base surface thickness T1 and the top surface thickness T2.

As illustrated in FIG. 10, the side surface metal layer 63 does not necessarily need to be formed over the entire side surface 42*c* of each protrusion 42, or it may be formed in at least a part of the side surface. The side surface metal layer 63 does not necessarily need to be formed on all of the protrusions 42, but it may be formed on some of the plurality of protrusions 42.

According to such a configuration, it is possible to obtain the advantages listed below.

(5) In comparison with the configuration in which the metal layer 31 covers only the base surface 41*a* and the top surface 42*a*, the state of the surface plasmons excited in the micro-display part 13 is changed. Therefore, the micro-display part 13 can transmit light having colors different from that of the light transmitted in the configuration in which the metal layer 31 covers only the base surface 41*a* and the top surface 42*a*.

(6) Since the side surface thickness T3 of the metal layer 31 is less than each of the top surface thickness T2 and the base surface thickness T1, transmittance of the micro-display part 13 is increased in comparison with the configuration in which the side surface thickness T3 is equal to or greater than each of the top surface thickness T2 and the base surface thickness T1.

In FIG. 10, if light with which the display body 10 is irradiated from the dielectric layer 32 toward the metal layer 31 is transmitted to the outside of the micro-display part 13, the side surface thickness T3 may be equal to or greater than each of the top surface thickness T2 and the base surface thickness T1.

Figure 11:
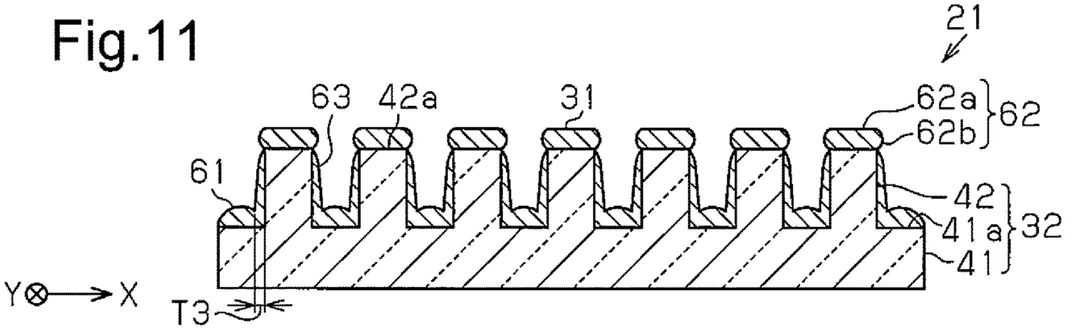
FIG. 11 is a partial cross-sectional view illustrating a partial cross-sectional structure of a micro-display part according to a modification.

As illustrated in FIG. 11, when the metal layer 31 is configured with the side surface metal layer 63, the top surface metal layer 62 may have the configuration illustrated in FIG. 8, and the base surface metal layer 61 may have the configuration illustrated in FIG. 8. At this time, the side surface thickness T3 of the side surface metal layer 63 may be, for example, configured to become less as the distance to the top surface 42*a* decreases and to become greater as the distance to the base surface 41*a* decreases. The thickness of the side surface metal layer 63 may be substantially the same over the entire side surface metal layer 63.

Figure 12:
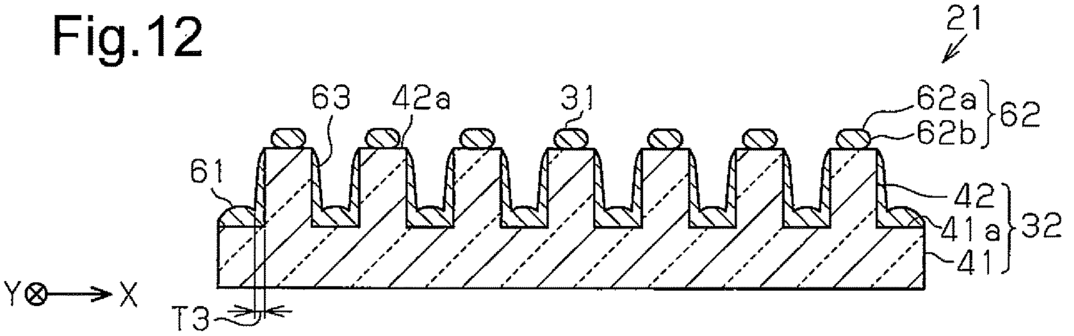
FIG. 12 is a partial cross-sectional view illustrating a partial cross-sectional structure of a micro-display part according to a modification.

As illustrated in FIG. 12, when the metal layer 31 is configured with the side surface metal layer 63, the top surface metal layer 62 may have the configuration illustrated in FIG. 9, and the base surface metal layer 61 may have the configuration illustrated in FIG. 9. At this time, the side surface thickness T3 of the side surface metal layer 63 may be, for example, configured to become less as the distance to the top surface 42*a* decreases and to become greater as the distance to the base surface 41*a* decreases. The thickness of the side surface metal layer 63 may be substantially the same over the entire side surface metal layer 63.

[Configuration of Dielectric Layer]

A modification of the dielectric layer 32 will now be described with reference to FIGS. 13 and 14.

The protrusions 42 included in the dielectric layer 32 do not necessarily need to be arranged in a tetragonal lattice shape.

Figure 13:
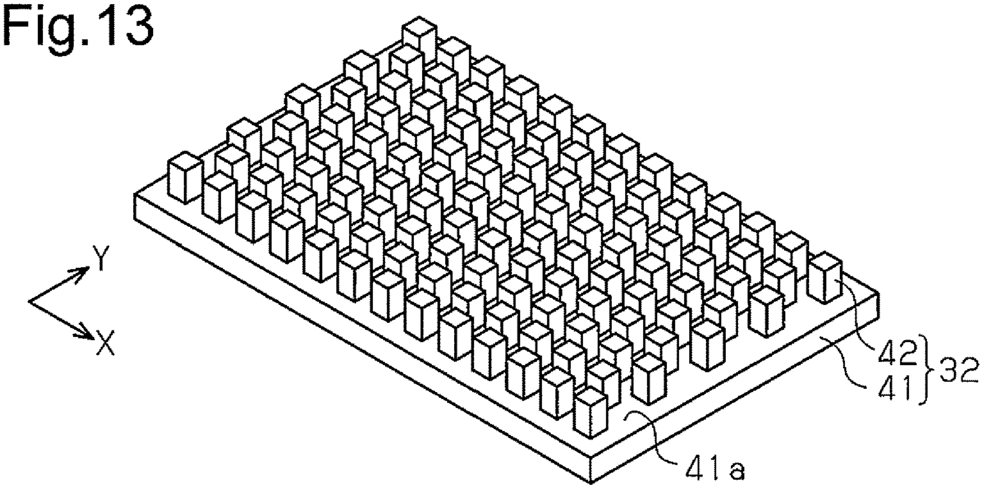
FIG. 13 is a partial perspective view illustrating a partial perspective structure of a dielectric layer according to a modification.
Figure 14:
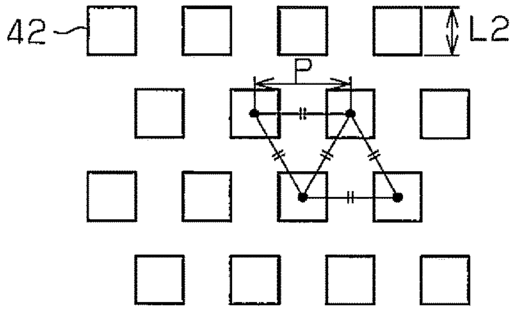
FIG. 14 is a top view illustrating a structure of a top surface of the dielectric layer according to a modification as viewed from the top side.

For example, as illustrated in FIG. 13, the protrusions 42 may be arranged in a hexagonal lattice shape. As illustrated in FIG. 14, when the protrusions 42 are arranged in a hexagonal lattice shape, distances between one protrusion 42 and six protrusions 42 located around the one protrusion 42 are equal to each other. That is, all of the protrusions 42 are arranged in the state that the adjacent protrusions 42 are separated from each other by a period P as an equal interval.

In this manner, when the protrusions 42 are arranged in a hexagonal lattice shape, since all the protrusions 42 are arranged to be spaced at an equal interval, the states of the surface plasmons formed in the interfaces 33 between the metal layers 31 and the dielectric layers 32 are substantially the same. For this reason, in comparison with the configuration in which the protrusions 42 are arranged in a tetragonal lattice shape, adjustment of color of the transmitted light of each display element 21 can be easily performed.

The protrusions 42 included in the dielectric layer 32 are not limited to the tetragonal lattice shape or the hexagonal lattice shape, the protrusions may be arranged in a trigonal lattice shape.

[Configuration of Micro-Display Part]

A modification of the micro-display part 13 will now be described with reference to FIG. 15.

The first display elements 22 included in the micro-display part 13 may include two or more plasmon structures having different colors in transmitted light, and the second display element 23 may include two or more plasmon structures having different colors in transmitted light.

Figure 15:
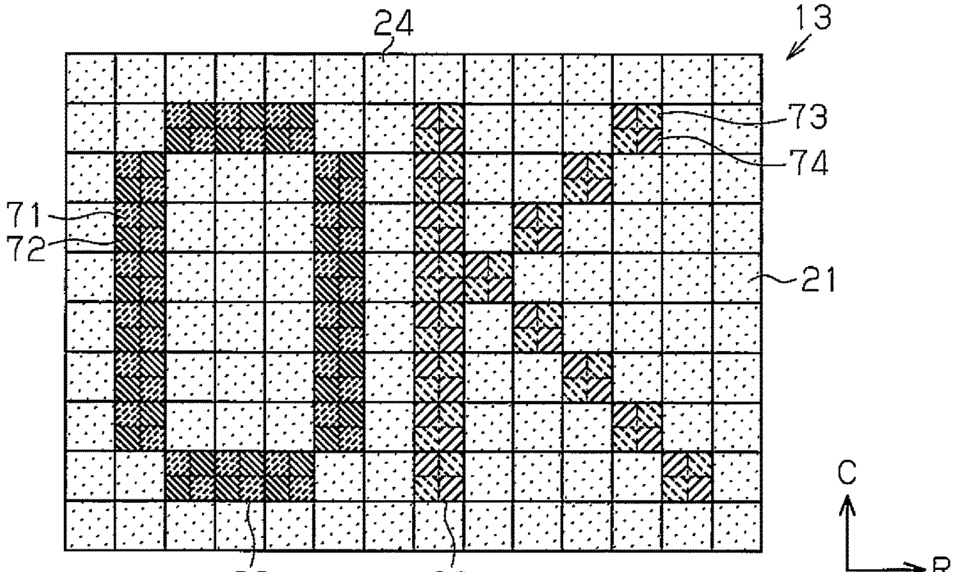
FIG. 15 is a diagram illustrating a micro-display part according to a modification in a magnified manner.

That is, as illustrated in FIG. 15, the first display element 22 includes two first portions 71 and two second portions 72, and each first portion 71 and each second portion 72 are configured with plasmon structures transmitting light having different colors. In the first display elements 22, the first portions 71 and the second portions 72 are, for example, arranged alternately in the column direction C and arranged alternately in the row direction R.

According to the first display elements 22, the light transmitted by the first display element 22 has a mixed color of the color of the light transmitted by each of the first portions 71 and the color of the light transmitted by each of the second portions 72. For this reason, it is possible to increase the number of colors which can be displayed by the micro-display part 13.

In the first display elements 22, the first portions 71 and the second portions 72 do not necessarily need to be arranged alternately in the column direction C or the row direction R, and the number of first portions 71 included in the first display element 22 may be different from the number of the second portions 72. However, in the first display elements 22, if the first portions 71 and the second portions 72 are configured to be arranged alternately in each of the column direction C and the row direction R and the number of first portions 71 included in the first display element 22 is configured to be equal to the number of second portions 72, deviation in color of the first display elements 22 can be eliminated. For this reason, the first display elements 22 can be easily recognized as the display element 21 displaying one color.

On the other hand, the second display element 23 includes a plurality of first portions 73 and a plurality of second portions 74, and the first portions 73 and the second portions 74 transmit light having different colors. The first portion 73 included in the second display element 23 may include a plasmon structure transmitting the light having the same color as that of any one of the first portion 71 or the second portion 72 included in the first display element 22. The second portion 74 included in the second display element 23 may include a plasmon structure transmitting the light having the same color as that of any one of the first portion 71 and the second portion 72 included in the first display element 22.

Similarly to the first display elements 22, in the second display elements 23, the first portions 73 and the second portions 74 are, for example, arranged alternately in the column direction C and arranged alternately in the row direction R. In the second display elements 23, the first portions 73 and the second portions 74 do not necessarily need to be arranged alternately in the column direction C or the row direction R.

In the configuration in which each of the first display elements 22 and each of the second display elements 23 transmit light having a mixed color, instead of the configuration in which the first display elements 22 include the first portions 71 or the second portions 72 as a set of the plasmon structures, it is preferable that the plasmon structures transmitting light having different colors be located in a mixed manner inside the first display elements 22. Such a configuration is also preferred in the second display element 23. Therefore, deviation in color displayed by each display element can be further restrained.

According to such a configuration, it is possible to obtain the advantages listed below.

(7) Since each display element 21 includes a plurality of plasmon structures having transmitted light having different colors, one display element 21 can transmit light having a mixed color of multiple colors. Therefore, it is possible to increase the number of colors which can be displayed by the micro-display part 13.

[Other Modifications]

The size of the display part 12 does not necessarily need to be such a size that the display size of the second information displayed by the display part 12 can be visually recognized. If the display part 12 has a size capable of including at least one micro-display part 13, the display part 12 may have a size to an extent that the display part 12 can be observed by an optical microscope.

The display element 21 may have a configuration of transmitting white light. In such a configuration, in the display element 21, for example, by configuring the periods P of a plurality of protrusions 42 to be irregular or configuring the heights of the protrusions 42 to be irregular, the states of the surface plasmons formed in minimum units of the plasmon structures become different from each other, so that the display element 21 transmits white light. In the configuration in which the periods P of the protrusions 42 are irregular, that is, in the configuration in which the protrusions 42 are arranged irregularly, the surface plasmons having different states can be easily excited inside the display element 21. For this reason, the light transmitted by the display element 21 becomes mixed light of a plurality of light beams having different wavelengths.

The light irradiated in the irradiation process does not necessarily need to be white light. Even in such a configuration, if the irradiation light includes light of which the color can be changed by the plasmon structure included in the micro-display part 13, it is possible to obtain the advantage in accordance with the above-described advantage (1).

In the display elements 21 constituting one micro-display part 13, the number of display elements 21 arranged in the row direction R and the number of display elements 21 arranged in the column direction C may be less than 10 or may be more than 100. Even in such a configuration, the size of one micro-display part 13 may be such a size that the micro-display part 13 is included in the display part 12 as a part of the display part 12. As long as the micro-display part 13 includes the plasmon structure, it is possible to obtain the advantage in accordance with the above-described advantage (1).

The length L1 of one side of the display element 21 may be less than 200 nm or may be greater than 3000 nm. Even in such a configuration, the size of the micro-display part 13 may be a size that the micro-display part 13 is included in the display part 12 as a part of the display part 12.

All of the display elements 21 constituting the micro-display part 13 may transmit light having the same color. Even in such a configuration, as long as each display element 21 includes the plasmon structure, it is possible to obtain the advantage in accordance with the above-described advantage (1).

In the base surface 41*a* of the base body 41, the period P of the formation of the protrusions 42 may be less than 100 nm or may be greater than 600 nm as long as surface plasmons are excited in the interface 33 between the metal layer 31 and the dielectric layer 32 to change the irradiation light to transmitted light having a color different from that of the irradiation light.

In the material for forming the metal layer 31, the real part of the complex dielectric constant in a visible light range may be 0 or more. Even in such a configuration, if the micro-display part 13 includes the plasmon structure including the interface 33 between the metal layer 31 and the dielectric layer 32, the plasmon structure can be embodied as a structure transmitting light having any one of wavelengths included in the visible light range.

The thickness of the metal layer 31 may be less than 20 nm or may be greater than 100 nm. Even in such a configuration, if the micro-display part 13 includes the plasmon structure including the interface 33 between the metal layer 31 and the dielectric layer 32, the irradiation light can be changed to the transmitted light having a color different from that of the irradiation light by the surface plasmons excited in the plasmon structure.

In the dielectric layer 32, the distance between the base surface 41*a* and the imaginary plane 42*b* may be less than 30 nm or may be greater than 500 nm. Even in such a configuration, if the micro-display part 13 includes the plasmon structure including the interface 33 between the metal layer 31 and the dielectric layer 32, the irradiation light can be changed to the transmitted light having a color different from that of the irradiation light by the surface plasmons excited by the plasmon structure.

In the dielectric layer 32, the base surface 41*a* of the base body 41 and the imaginary plane 42*b* including the top surface 42*a* of each of the protrusions 42 do not necessarily need to be substantially parallel to each other, but for example, the base surface 41*a* and the imaginary plane 42*b* may be crossed at a predetermined angle. Even in such a configuration, if the micro-display part 13 includes the plasmon structure including the interface 33 between the metal layer 31 and the dielectric layer 32, the irradiation light can be changed to the transmitted light having a color different from that of the irradiation light by the surface plasmons excited by the plasmon structure.

[Print Layer]

The display body 10 may include a print layer as described hereinafter with reference to FIGS. 16 to 19.

Figure 16:
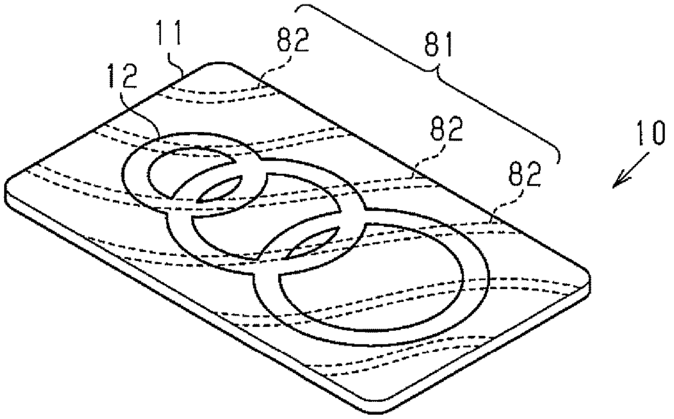
FIG. 16 is a perspective view illustrating a perspective structure of a display body according to a modification.

As illustrated in FIG. 16, the display body 10 includes a print layer 81, and the print layer 81 is configured with a plurality of print portions 82 having a wavy line shape. The print portions 82 are arranged on the substrate 11 to be spaced at a predetermined interval in one direction.

As viewed from the direction facing the display part 12, a part of the print portions 82 does not overlap with the display part 12, and another part of the print portions 82 overlaps with the display part 12. As viewed from the direction facing the display part 12, at least a part of the print portions 82 overlapping with the display part 12 overlaps with at least one of the micro-display parts 13. Furthermore, as viewed from the direction facing the display part 12, each print portion 82 may be arranged at a position which overlaps with the display part 12 and does not overlap with the micro-display part 13.

The print layer 81 forms an example of a colored figure pattern as a pattern formed with a plurality of wavy line shapes. However, the print layer 81 may form a colored figure pattern formed with a plurality of circular arc shapes or a colored figure pattern formed with a plurality of circular shapes. The print layer 81 may form a colored figure pattern formed by combining two or more of the shapes of the wavy line shape, the circular arc shape, and the circular shape. Alternatively, the print layer 81 may form a pattern formed with geometric shapes other than the wavy line shape, the circular arc shape, and the circular shape. That is, the image as information displayed by the print layer 81 may be a predetermined design pattern.

Figure 17:
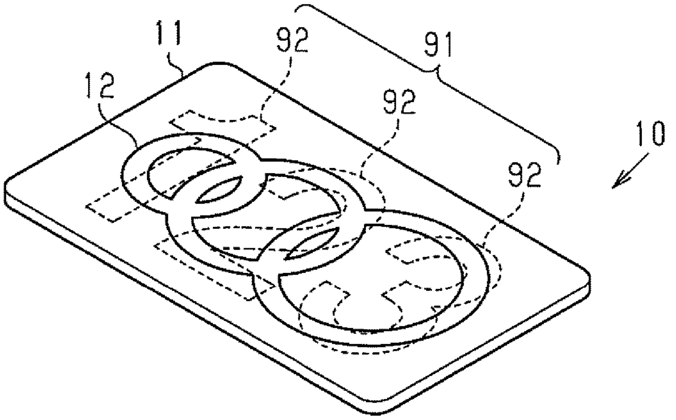
FIG. 17 is a perspective view illustrating a perspective structure of a display body according to a modification.

As illustrated in FIG. 17, a print layer 91 included in the display body 10 does not necessarily need to be in the form of the above-described predetermined design pattern, but it may form individual information such as a card number and a lot number as information including at least one of characters and numerals. That is, the image as information displayed by the print layer 91 may include at least one of predetermined characters and numerals.

The print layer 91 is configured with a plurality of print portions 92, and the print portions 92 are arranged in the substrate 11 in a predetermined direction. Each print portion 92 displays, for example, one numeral, and the print portions 92 display a numeral "1", a numeral "2", and a numeral "3" in the order from the print portion 92 located in the shortest distance from the one end of the substrate 11.

As viewed from the direction facing the display part 12, a part of each print portion 92 overlaps with the display part 12. As viewed from the direction facing the display part 12, at least a part of the print portion 92 overlapping with the display part 12 overlaps with at least one of the micro-display parts 13. Furthermore, as viewed from the direction facing the display part 12, each print portion 92 may be arranged at a position which overlaps with the display part 12 and does not overlap with the micro-display part 13.

The image as information displayed by the print layers 81 and 91 is not limited to the aforementioned design patterns, characters, and numerals, but the image may be figures or symbols or may be a combination of at least two of design patterns, characters, numerals, figures, and symbols.

Next, a cross-sectional structure of the display body 10 will now be described with reference to FIGS. 18 and 19. Although the display body 10 described with reference to FIG. 16 and the display body 10 described with reference to FIG. 17 are different from each other in terms of the image displayed by the print layer, the part where the print layer is arranged in the display body 10 is common to the two display bodies 10. For this reason, hereinafter, the cross-sectional structure of the display body 10 described with reference to FIG. 16 is described, and the description of the cross-sectional structure of the display body 10 described with reference to FIG. 17 is omitted.

An example in which the display part 12 is formed by a metal layer formed on the substrate 11 will now be described.

Figure 18:
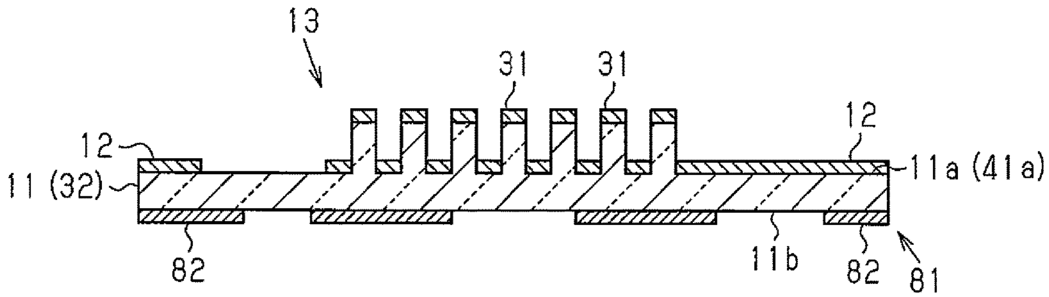
FIG. 18 is a partial cross-sectional view illustrating a partial cross-sectional structure of a display body according to a modification.

As illustrated in FIG. 18, the substrate 11 includes the dielectric layer 32 included in the micro-display part 13, and among the surfaces of the substrate 11, a surface including the base surface 41*a* of the dielectric layer 32 is a front surface 11*a* and a surface which is opposite to the front surface 11*a* in the substrate 11 is a back surface 11*b*.

The display part 12 formed with the metal layer may be arranged on the front surface 11*a* of the substrate 11, and the display part 12 may be formed with a metal layer common to the metal layer 31 included in the micro-display part 13 or may be formed with a metal layer different from the metal layer 31 included in the micro-display part 13.

The print portions 82 constituting the print layer 81 are formed on the back surface 11*b* of the substrate 11. The print portions 82 are portions formed, for example, by ink or the like containing predetermined dye or pigment and portions formed by using various printing methods, for example, a gravure printing method, an offset printing method, a screen printing method, and the like.

The print layer 81 may be formed in portions other than the back surface 11*b* of the substrate 11. That is, as illustrated in FIG. 19, a transparent plastic layer 101 covering the display part 12 and the micro-display part 13 is formed on the front surface 11*a* of the substrate 11. The transparent plastic layer 101 is a layer formed by a plastic capable of transmitting light. In the transparent plastic layer 101, a surface which is opposite to the surface being in contact with the front surface 11*a* of the substrate 11 is a front surface 101*a*, and the print portions 82 are formed on the front surface 101*a*.

The transparent plastic layer 101 may be a layer having adhesiveness for attaching the display body 10 to a product such as an object-to-be-authenticated, and the layer having adhesiveness may be formed on the front surface 101*a* of the transparent plastic layer 101 or the back surface 11*b* of the substrate 11 separately from the transparent plastic layer 101.

In the configuration in which the display body 10 includes the transparent plastic layer 101, the print layers 81 may be formed on both of the front surface 101*a* of the transparent plastic layer 101 and the back surface 11*b* of the substrate 11.

In the configuration in which the display body 10 includes the above-described print layer 81 and the print layer 81 is arranged on the back surface 11*b* of the substrate 11, when the display body 10 is visually recognized from the side of the back surface 11*b* of the substrate 11, a part of the display part 12, that is, a part of the second information displayed by the display part 12 can be concealed from the observer by the print layer 81.

In the display body 10, in the configuration in which the print layer 81 is arranged on the front surface 101*a* of the transparent plastic layer 101, when the display body 10 is visually recognized from the side of the front surface 101*a* of the transparent plastic layer 101, a part of the display part 12, that is, a part of the second information displayed by the display part 12 can be concealed from the observer by the print layer 81.

Therefore, when the observer faces the display body 10, that is, as viewed from the direction normal to the display part 12, the information displayed by the print layer 81 is visually recognized. On the other hand, when the observer observes the display body 10 in a slanted direction, as viewed from the direction facing the display part 12, a part of the display part 12 overlapping with the print layer 81 is visually recognized.

In this manner, according to the display body 10 including the print layer 81, by changing the angle at which the observer observes the display body 10, the information displayed by the print layer 81 and the part of the second information concealed by the print layer 81 can be individually observed. Since the print layer 81 is a layer formed by ink as described above and the display part 12 is a layer formed with the metal layer, the print layer 81 has optical effects different from those of the display part 12, so that the second information can be easily recognized.

As described above, as viewed from the direction facing the display part 12, the print layer 81 and the display part 12 may be configured to be located to be separated from each other, that is, the print layer 81 may be configured not to conceal the display part 12 and the second information displayed by the display part 12.

According to such a configuration, by a combination of the print layer 81 and the display part 12, characters, symbols, figures, design patterns or the like having optical effects different from the optical effects obtained by only the print layer 81 or only the display part 12 can be formed.

By changing the angle at which the observer observes the display body 10, the information displayed by the print layer 81 and the second information displayed by the display part 12 can be individually observed. Since the print layer 81 has optical effects different from those of the display part 12, the second information can be easily recognized.

Furthermore, as viewed from the direction facing the display part 12, the print layer 81 conceals at least one of the micro-display parts 13, that is, at least one piece of first information. According to such a configuration, the region where the first information is displayed can be restricted by the print layer 81, so that the position where the first information is arranged can be inconspicuous.

As described above, as viewed from the direction facing the display part 12, the print layer 81 and the display part 12 can be configured to be located to be separated from each other, that is, the print layer 81 can be configured not to conceal the first information displayed by the micro-display part 13.

According to such a configuration, when the observer of the display body 10 observes the second information, the observer focuses attention on the second information and the information displayed by the print layer 81. It is thus difficult to notice that information other than the second information and the information displayed by the print layer 81 can be displayed by the display body 10. Therefore, in the display body 10, it is possible to make it more difficult to notice the first information.

When the first information is observed, in the display body 10, since the light amount of the transmitted light in the part other than the micro-display parts 13 can be reduced by the print layer 81, the contrast between the first information and the periphery of the first information is increased, so that the first information can be more easily recognized. This advantage can be obtained from any one of the configuration in which the print layer 81 is formed on the back surface 11*b* of the substrate 11 and the configuration in which the print layer 81 is formed on the front surface 101*a* of the transparent plastic layer 101. This advantage can be obtained from both the case in which the display body 10 is visually recognized from the side of the front surface 11*a* of the substrate 11 and the case in which the display body 10 is visually recognized from the back surface 11*b*.

Figure 19:
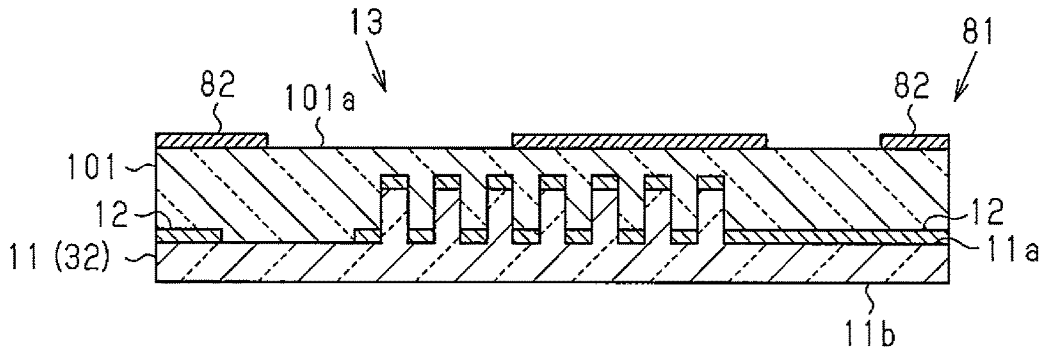
FIG. 19 is a partial cross-sectional view illustrating a partial cross-sectional structure of a display body according to a modification.

The same advantages as those obtained by the print layer 81 can also be obtained by the display body 10 including a print layer 91 illustrated in FIG. 19.

Figure 20:
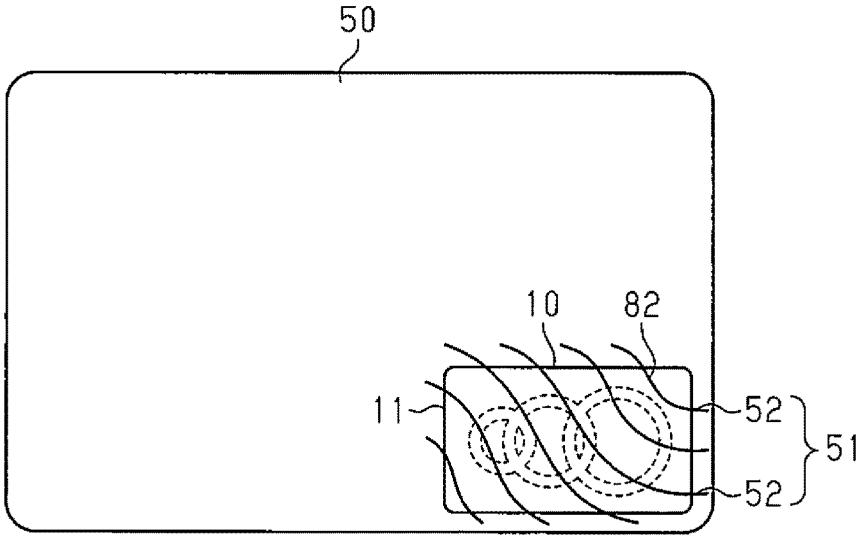
FIG. 20 is a plan view illustrating a plan structure of an object-to-be-authenticated according to a modification.

As illustrated in FIG. 20, in the configuration in which the display body 10 includes the print layer 81 displaying a pattern configured with geometric shapes such as the above-described colored figure pattern, an object-to-be-authenticated 50 attached with the display body 10 may have a print layer 51. The print layer 51 is configured to include a plurality of print portions 52, and as viewed from the direction facing the display part 12, each of the print portions 52 is connected to one of the print portions 82 formed in the display body 10. That is, the print layer 81 included in the display body 10 and the print layer 51 included in the object-to-be-authenticated 50 display one colored figure pattern.

The invention claimed is:

1. A display body comprising:

a first display part, which displays first information; and a second display part, which displays second information having a display size greater than that of the first information, wherein the second display part includes the entire first display part as a part of the second display part, the first display part includes a plasmon structure, and the plasmon structure is configured to include an interface between a metal layer and a dielectric layer that transmits light, excite surface plasmons in the interface to change irradiation light with which the interface is irradiated to transmitted light having a color different from that of the irradiation light, and display the first information with the transmitted light, the dielectric layer includes a base surface and a plurality of protrusions protruding from the base surface, the base surface and an imaginary plane including top surfaces of a plurality of the protrusions are substantially parallel to each other, the metal layer covers at least a part of the dielectric layer, in the metal layer, a part located on one of the top surfaces includes a flat portion extending along the top surface and a peripheral surface having a curved shape, which is provided in a periphery of the flat portion and protrudes toward an outside of the flat portion, and in the metal layer, a part located on the base surface has a convex shape, which protrudes to the largest degree at a substantially center of a region between the protrusions adjacent to each other.

2. The display body according to claim 1, wherein
the first information includes a plurality of information elements,
the plurality of information elements include a first information element, which represents a first color, and a second information element, which represents a second color,
the first display part includes a plurality of display elements, and
each display element corresponds to one of the information elements.

3. The display body according to claim 2, wherein at least one of the display elements includes a plurality of the plasmon structures, which change the irradiation light to the transmitted light having different colors.

4. The display body according to claim 1, wherein, in the dielectric layer, a distance between the base surface and the imaginary plane is 30 nm or more and 500 nm or less.

5. The display body according to claim 1, wherein
a thickness of the metal layer is 20 nm or more and 100 nm or less, and
in a material for forming the metal layer, a real part of a complex dielectric constant in a visible light range has a negative value.

6. The display body according to claim 1, wherein
each of the protrusions has a side surface connecting the top surface and the base surface, and
the metal layer covers the base surface and the top surface of each of the protrusions and covers at least a part of the side surface.

7. The display body according to claim 6, wherein, in the metal layer, a thickness of a part covering the side surface is less than a thickness of a part covering the top surface and a thickness of a part covering the base surface.

8. The display body according to claim 1, wherein
the plurality of protrusions are arranged in the base surface in a state of one of a trigonal lattice shape, a tetragonal lattice shape, and a hexagonal lattice shape, and
as viewed from a plane facing the base surface, a distance between centers of the protrusions in the protrusions adjacent to each other is 100 nm or more and 600 nm or less.

9. The display body according to claim 1, wherein the plurality of protrusions is arranged irregularly on the base surface.

10. The display body according to claim 1, wherein
the first display part includes a plurality of display elements,
each of the plurality of display elements is configured with a part of the dielectric layer including at least one of the protrusions, and
in at least a part of the plurality of display elements, at least one of an inter-center distance between the protrusions as viewed from a plane facing the base surface, a distance between the base surface and the imaginary plane, an arrangement state of the protrusions, a thickness of the metal layer, and a material for forming the metal layer differs among the display elements.

11. The display body according to claim 10, wherein
each of the display elements defines a polygonal shaped region, and
a length of one side of the polygonal shaped region is 200 nm or more and 3000 nm or less.

12. The display body according to claim 10, wherein
the plurality of display elements are arranged in a matrix shape, and
the number of display elements arranged in each of a row direction and a column direction perpendicular to the row direction is 10 or more and 100 or less.

13. A method for observing a display body, wherein
the display body includes:
a first display part, which displays first information; and
a second display part, which displays second information having a display size greater than that of the first information,
the second display part includes the entire first display part as a part of the second display part,
the first display part includes a plasmon structure, and
the plasmon structure is configured to
include an interface between a metal layer and a dielectric layer that transmits light,
excite surface plasmons in the interface to change irradiation light with which the interface is irradiated to transmitted light having a color different from that of the irradiation light, and
display the first information with the transmitted light,
the dielectric layer includes a base surface and a plurality of protrusions protruding from the base surface,
the base surface and an imaginary plane including top surfaces of a plurality of the protrusions are substantially parallel to each other,
the metal layer covers at least a part of the dielectric layer,
in the metal layer, a part located on one of the top surfaces includes a flat portion extending along the top surface and a peripheral surface having a curved shape, which is provided in a periphery of the flat portion and protrudes toward an outside of the flat portion, and
in the metal layer, a part located on the base surface has a convex shape, which protrudes to the largest degree at a substantially center of a region between the protrusions adjacent to each other,
the method comprising:
irradiating the interface of the display body with the irradiation light; and
observing the display body irradiated with the irradiation light under a microscope.

* * * * *